(12) United States Patent
Chou et al.

(10) Patent No.: US 11,235,287 B2
(45) Date of Patent: Feb. 1, 2022

(54) POLYIMIDE COMPOSITION

(71) Applicant: Taiwan Textile Research Institute, New Taipei (TW)

(72) Inventors: Shang-Chih Chou, New Taipei (TW); Chun-Hung Chen, New Taipei (TW); Chun-Hung Lin, New Taipei (TW); Kueir-Rarn Lee, New Taipei (TW)

(73) Assignee: Taiwan Textile Research Institute, New Taipei (TW)

( * ) Notice: Subject to any disclaimer, the term of this patent is extended or adjusted under 35 U.S.C. 154(b) by 0 days.

(21) Appl. No.: 16/996,853

(22) Filed: Aug. 18, 2020

(65) Prior Publication Data

US 2020/0376446 A1 Dec. 3, 2020

Related U.S. Application Data

(62) Division of application No. 15/472,272, filed on Mar. 29, 2017, now Pat. No. 10,792,621.

(30) Foreign Application Priority Data

Apr. 8, 2016 (TW) .................. 105111004

(51) Int. Cl.
*B01D 67/00* (2006.01)
*B01D 69/12* (2006.01)
*C08G 73/10* (2006.01)
*B01D 69/02* (2006.01)
*B01D 71/60* (2006.01)
*B01D 71/64* (2006.01)
*C08L 79/08* (2006.01)
*C09D 179/08* (2006.01)
*B01D 61/36* (2006.01)
*C08J 7/04* (2020.01)
*B01D 71/80* (2006.01)

(52) U.S. Cl.
CPC ..... *B01D 67/0009* (2013.01); *B01D 67/0006* (2013.01); *B01D 67/0011* (2013.01); *B01D 69/02* (2013.01); *B01D 71/64* (2013.01); *B01D 71/80* (2013.01); *C08G 73/1042* (2013.01); *C08G 73/1067* (2013.01); *C08G 73/1071* (2013.01); *C08J 7/0427* (2020.01); *C08L 79/08* (2013.01); *C09D 179/08* (2013.01); *B01D 61/362* (2013.01); *B01D 2323/08* (2013.01); *B01D 2323/30* (2013.01); *B01D 2325/04* (2013.01); *C08J 2323/12* (2013.01); *C08J 2367/00* (2013.01); *C08J 2479/08* (2013.01)

(58) Field of Classification Search
CPC ..................................... B01D 71/64
See application file for complete search history.

(56) References Cited

U.S. PATENT DOCUMENTS

2006/0135732 A1* 6/2006 Yeager ............... B01D 67/0011
528/170
2011/0269915 A1* 11/2011 Koros ............... C08G 73/1039
525/420

* cited by examiner

*Primary Examiner* — Alex A Rolland
(74) *Attorney, Agent, or Firm* — JCIPRNET

(57) ABSTRACT

A preparation method of separation membrane is provided. First, a polyimide composition including a dissolvable polyimide, a crosslinking agent, and a solvent is provided. The dissolvable polyimide is represented by formula 1:

formula 1

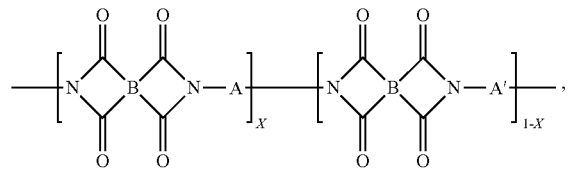

wherein B is a tetravalent organic group derived from a tetracarboxylic dianhydride containing aromatic group, A is a divalent organic group derived from a diamine containing aromatic group, A' is a divalent organic group derived from a diamine containing aromatic group and carboxylic acid group, and $0.1 \leq X \leq 0.9$. The crosslinking agent is an aziridine crosslinking agent, an isocyanate crosslinking agent, an epoxy crosslinking agent, a diamine crosslinking agent, or a triamine crosslinking agent. A crosslinking process is performed on the polyimide composition. The polyimide composition which has been subjected to the crosslinking process is coated on a substrate to form a polyimide membrane. A dry phase inversion process is performed on the polyimide membrane.

5 Claims, No Drawings

POLYIMIDE COMPOSITION

CROSS-REFERENCE TO RELATED APPLICATION

This application is a divisional application of and claims the priority benefit of U.S. patent application Ser. No. 15/472,272, filed on Mar. 29, 2017, now allowed, which claims the priority benefit of Taiwan application serial no. 105111004, filed on Apr. 8, 2016. The entirety of each of the above-mentioned patent applications is hereby incorporated by reference herein and made a part of this specification.

BACKGROUND OF THE INVENTION

1. Field of the Invention

The present invention generally relates to a composition, and particularly to a polyimide composition, and a preparation method of separation membrane using the polyimide composition.

2. Description of Related Art

Membrane separation processes are a technology that becomes increasingly important in the field of separation science, and find wide use in the separation of gas or liquid components, for example gas separation, pervaporation (PV), vapour permeate (VP) or liquid filtration. In a conventional membrane separation process, the film is generally made of polytetrafluoroethylene (PTFE), ceramic or glass fiber. Although the PTFE, ceramic or glass fiber separation membranes all have good resistance to high-polarity solvents, the processability of the ceramic or glass fiber separation membranes is poor. Moreover, in the prior art, the PTFE, ceramic or glass fiber separation membrane can only be used in microfiltration (MF). Therefore, one objective in urgent need for development in the field is to prepare a separation membrane with good resistance to high-polarity solvents and processability that can be used in PV and VP.

SUMMARY OF THE INVENTION

Accordingly, the present invention is directed to a polyimide composition that is useful in a preparation method of separation membrane, and a separation membrane with good resistance to high-polarity solvent and processability that can be used in PV and VP can be prepared through the preparation method.

The preparation method of separation membrane according to the present invention comprises the following steps. First, a polyimide composition including a dissolvable polyimide, a crosslinking agent, and a solvent is provided. The dissolvable polyimide is represented by formula 1 below:

formula 1

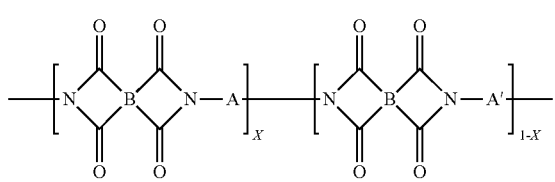

where B is a tetravalent organic group derived from a tetracarboxylic dianhydride containing aromatic group, A is a divalent organic group derived from a diamine containing aromatic group, A' is a divalent organic group derived from a diamine containing aromatic group and carboxylic acid group, and $0.1 \leq X \leq 0.9$. The crosslinking agent is an aziridine crosslinking agent, an isocyanate crosslinking agent, an epoxy crosslinking agent, a diamine crosslinking agent, or a triamine crosslinking agent. A crosslinking process is performed on the polyimide composition. The polyimide composition which has been subjected to the crosslinking process is coated on a substrate to form a polyimide membrane. A dry phase inversion process is performed on the polyimide membrane.

In an embodiment of the present invention, based on the total weight of the polyimide composition, the content of the dissolvable polyimide is 5 to 25 wt %, and the content of the crosslinking agent is 1 to 15 wt %.

In an embodiment of the present invention, in formula 1, B is

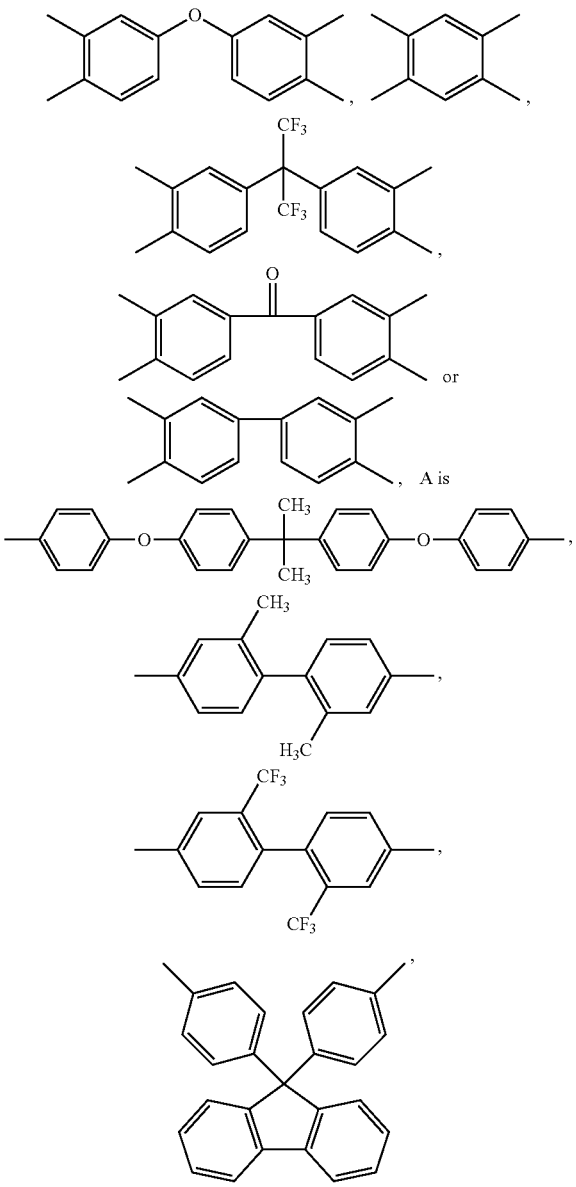

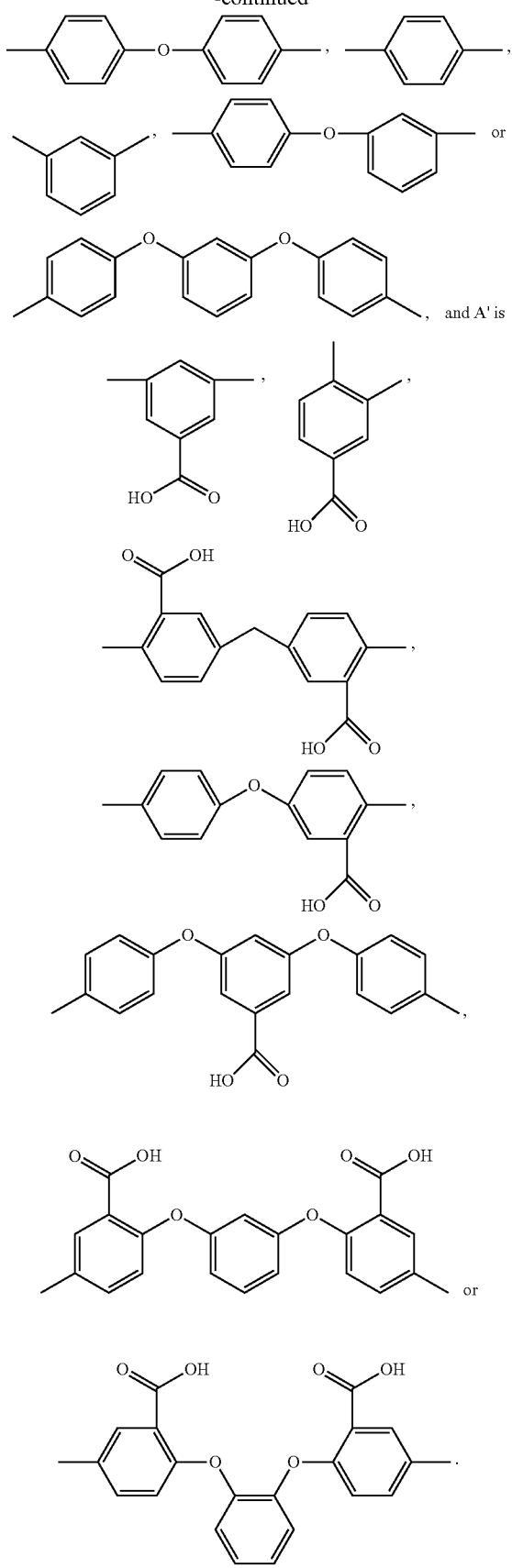

In an embodiment of the present invention, in formula 1, B is

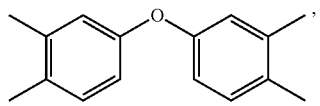

A is

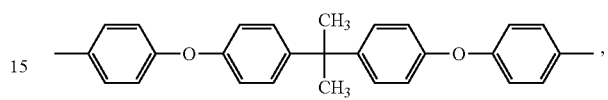

and A' is

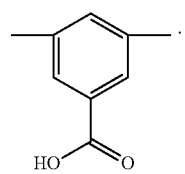

In an embodiment of the present invention, the aziridine crosslinking agent may include

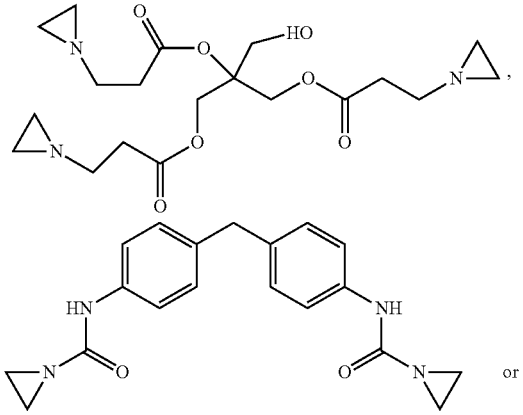

or

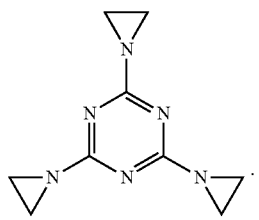

In an embodiment of the present invention, the duration of the crosslinking process is from 1 to 8 hours, and the temperature of the crosslinking process is in the range of 15 to 100° C.

In an embodiment of the present invention, the thickness of the polyimide membrane is in the range of 1 to 50 μm.

The polyimide composition of the present invention includes a dissolvable polyimide, a crosslinking agent, and a solvent. The dissolvable polyimide is represented by formula 1:

formula 1

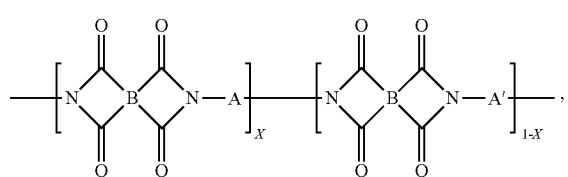

where B is a tetravalent organic group derived from a tetracarboxylic dianhydride containing aromatic group, A is a divalent organic group derived from a diamine containing aromatic group, A' is a divalent organic group derived from a diamine containing aromatic group and carboxylic acid group, and $0.1 \leq X \leq 0.9$. The crosslinking agent is an aziridine crosslinking agent, an isocyanate crosslinking agent, an epoxy crosslinking agent, a diamine crosslinking agent, or a triamine crosslinking agent.

In an embodiment of the present invention, in formula 1, B is

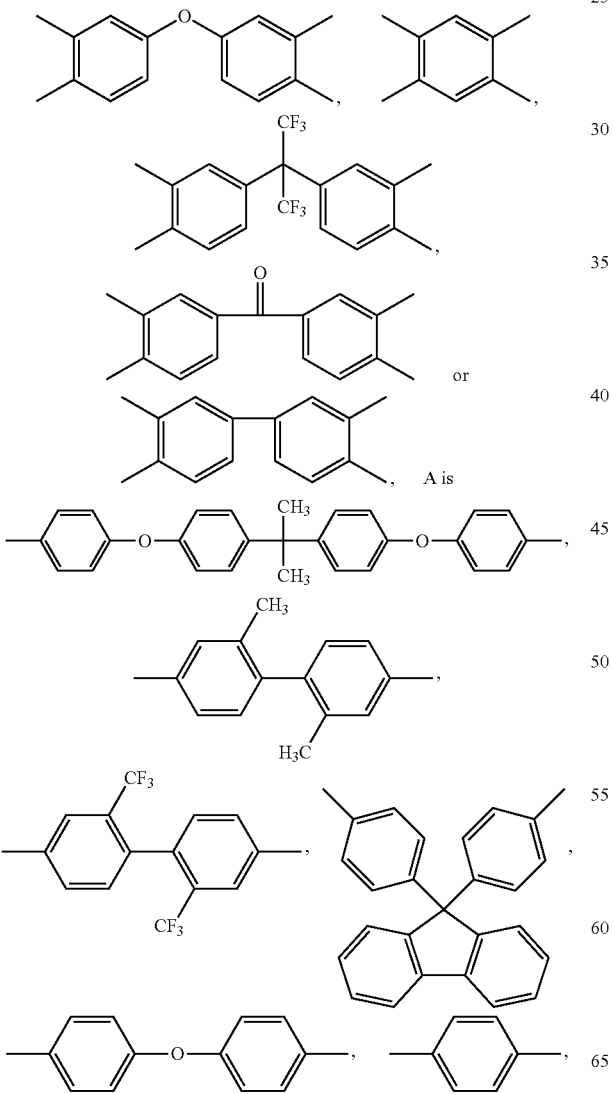

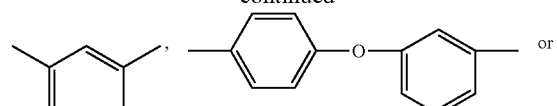

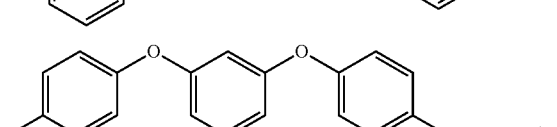

, and A' is

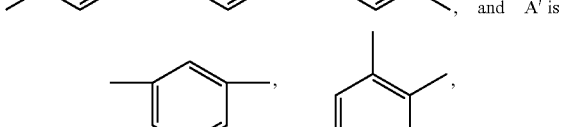

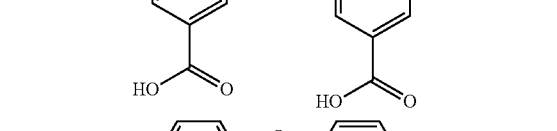

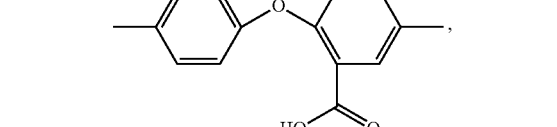

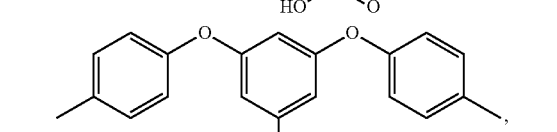

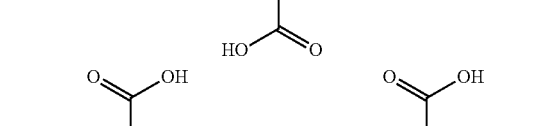

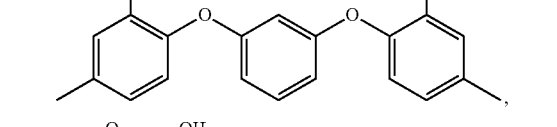

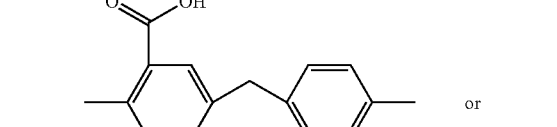

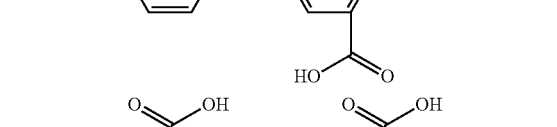

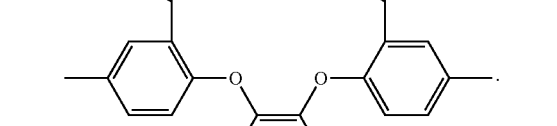

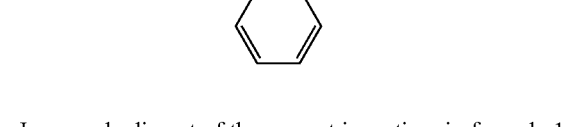

.

In an embodiment of the present invention, in formula 1, B is

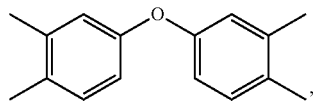

A is

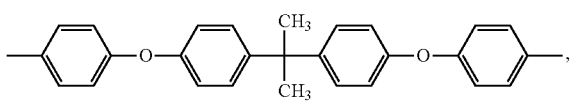

and A' is

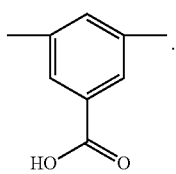

In an embodiment of the present invention, the aziridine crosslinking agent may include:

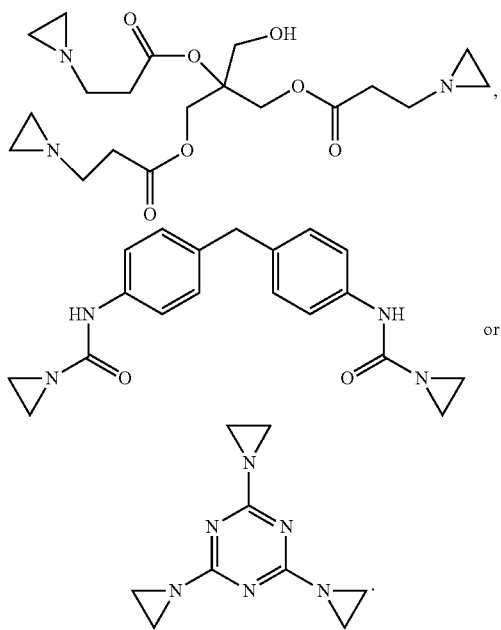

In an embodiment of the present invention, based on the total weight of the polyimide composition, the content of the dissolvable polyimide is 5 to 25 wt %, and the content of the crosslinking agent is 1 to 15 wt %.

Based on the above description, the polyimide composition of the present invention includes a dissolvable polyimide, a crosslinking agent and a solvent, and the dissolvable polyimide contains a specific ratio of a divalent organic group derived from a diamine containing aromatic group and a divalent organic group derived from a diamine containing aromatic group and carboxylic acid group, such that the dissolvable polyimide can be dissolved in the solvent and cross-linked with the crosslinking agent. As such, the polyimide composition of the present invention is convenient for being processed to form a membrane, and a separation membrane with good processability and resistance to high-polarity solvent that is useful in PV and VP can be prepared through the preparation method of separation membrane using the polyimide composition according to the present invention.

To make the features and advantages of the present invention clearer and more comprehensible, the present invention is described in detail below with reference to specific embodiments.

DESCRIPTION OF THE EMBODIMENTS

Herein, the range from "one numerical value to another numerical value" is a summary notation by which all numerical values in the range are avoided to be enumerated in the specification. Therefore, reference to a particular numerical range encompasses any numerical values within that range and smaller numerical ranges defined by any numerical values within that range, as if any of the numerical values and the smaller ranges of numerical values are expressly indicated in the specification.

Herein, the structure of a polymer or a group is sometimes represented by a skeleton formula. In this representation, carbon atoms, hydrogen atoms, and carbon-hydrogen bonds may be omitted. Of course, where the atom or atomic group is expressly drawn in the structural formula, what is drawn prevails.

To prepare a separation membrane with good resistance to high-polarity solvent and processability that can be used in PV, the present invention provides a polyimide composition, and a preparation method of separation membrane using the polyimide composition. The separation membrane prepared through the preparation method of separation membrane can achieve the above advantages. Hereinafter, the polyimide composition, and the preparation method of separation membrane of the present invention are described in detail with reference to embodiments, based on which the present invention can be practiced.

[Polyimide Composition]

A polyimide composition according to an embodiment of the present invention includes a dissolvable polyimide, a crosslinking agent, and a solvent.

In this embodiment, the dissolvable polyimide is represented by formula 1:

formula 1

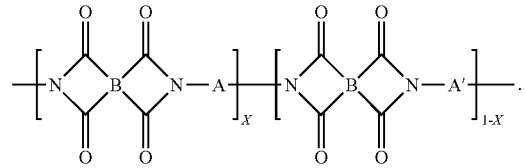

In formula 1, B is a tetravalent organic group derived from a tetracarboxylic dianhydride containing aromatic group. That is to say, B is a residue in the tetracarboxylic dianhydride containing aromatic group other than the two 2 carboxylic dianhydride groups (—$(CO)_2O$). Herein, the tetracarboxylic dianhydride containing aromatic group is also referred to as dianhydride monomer.

Particularly, in this embodiment, B is

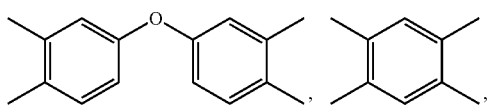

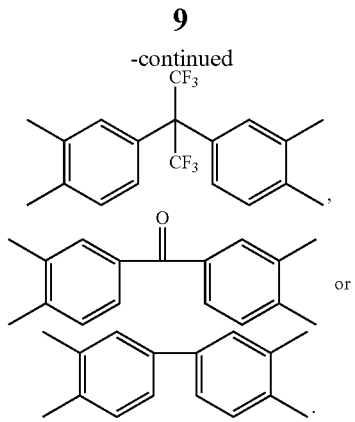

That is to say, the tetracarboxylic dianhydride containing aromatic group (that is, dianhydride monomer) may be bis-(3-phthalyl anhydride) ether (ODPA), 1,2,4,5-benzenetetracarboxylic anhydride (PMDA), 4,4'-(hexafluoroisopropylidene) diphthalic anhydride (6FDA), 3,3',4,4'-benzophenonetetracarboxylic dianhydride (BTDA), or 3,3',4,4'-biphenyltetracarboxylic dianhydride (BPDA).

In formula 1, A is a divalent organic group derived from a diamine containing aromatic group, and A' is a divalent organic group derived from a diamine containing aromatic group and carboxylic acid group. That is to say, A and A' are respectively a residue in the diamine compound other than the 2 amino groups (—NH$_2$). Herein, the diamine containing aromatic group, and the diamine containing aromatic group and carboxylic acid group are both referred to as diamine monomers. From another point of view, in this embodiment, plural diamine monomers need to be used for preparing the dissolvable polyimide represented by formula 1.

Particularly, in this embodiment, A is

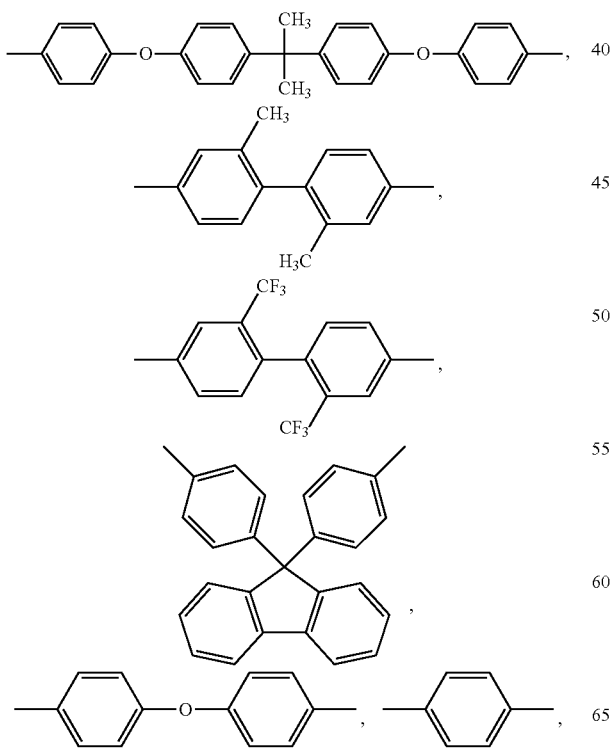

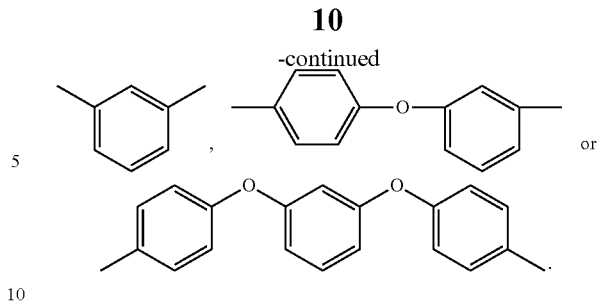

That is to say, the diamine containing aromatic group (that is, diamine monomer) may be 2,2-bis [(4-aminophenoxy) phenyl] propane (BAPP), 2,2'-bis(methyl)benzidine (DMB), 2,2'-bis(trifluoromethyl)benzidine (TFMB), 4,4'-(9-fluorenylidene)dianiline (FDA), 4,4'-diaminodiphenyl ether, p-phenylenediamine, m-phenylenediamine, 2,4'-diaminodiphenyl ether or 1,3-bis-4-aminophenoxybenzene (TPE-R).

Further, in this embodiment, A' is

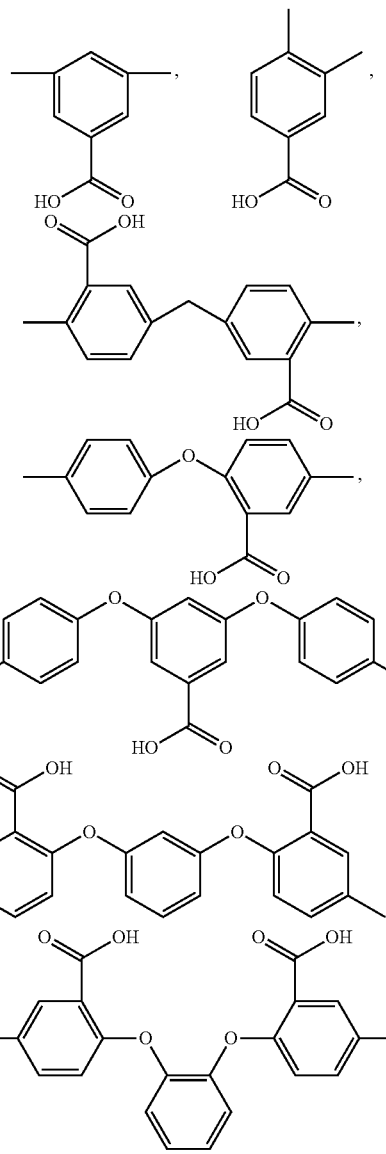

That is to say, the diamine containing aromatic group and carboxylic acid group (that is, diamine monomer) may be 3,5-diaminobenzoic acid (DABA), 3,4-diaminobenzoic acid, 5,5'-methylene bis(2-amino-benzoic-acid) (MBA), or other diamines bearing a carboxylic acid functional group.

In formula 1, $0.1 \leq X \leq 0.9$, and preferably $0.3 \leq X \leq 0.7$.

Moreover, the dissolvable polyimide represented by formula 1 is obtained through an imidization reaction of the dianhydride monomer and the diamine monomers. In particular, the imidization takes place in a solvent through any method well known to those skilled in the art. The solvent is not particularly limited, as long as it can dissolve the dianhydride monomer and the diamine monomers. In this embodiment, the solvent includes, but is not limited to: N-methyl-2-pyrrolidone (NMP), N,N-dimethylacetamide (DMAc), dimethyl sulfoxide (DMSO), dimethylformamide (DMF), hexamethylphosphoramide, m-cresol or a combination thereof. In addition, the imidization ratio of the imidization reaction is 100%. In addition, in an embodiment, B in formula 1 is

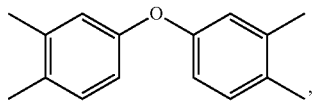

A in formula 1 is

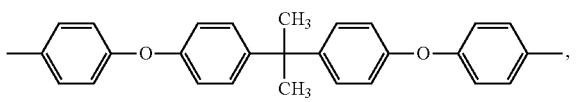

and A' in formula 1 is

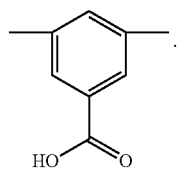

That is, the dissolvable polyimide represented by formula 1 in this embodiment is obtained through an imidization reaction of ODPA, BAPP, and DABA.

Notably, the inventors find that the polyimide can be dissolved in a solvent (described in detail hereinafter) by comprising a divalent organic group derived from a diamine containing aromatic group, and the polyimide can be crosslinked with a crosslinking agent (described in detail hereinafter) by comprising a divalent organic group derived from a diamine containing aromatic group and carboxylic acid group. As a result, in this embodiment, the dissolvable polyimide represented by formula 1 can be dissolved in the solvent (described in detail hereinafter) and crosslinked with the crosslinking agent (described in detail hereinafter) by comprising a specific ratio of the divalent organic group derived from a diamine containing aromatic group and the divalent organic group derived from a diamine containing aromatic group and carboxylic acid group.

In this embodiment, the crosslinking agent may be an aziridine crosslinking agent, an isocyanate crosslinking agent, an epoxy crosslinking agent, a diamine crosslinking agent or a triamine crosslinking agent. In particular, in this embodiment, the crosslinking agent can be crosslinked with the carboxylic acid group contained in the divalent organic group derived from a diamine containing aromatic group and carboxylic acid group in the dissolvable polyimide represented by formula 1, at a temperature ranging from 15 to 100° C.

Particularly, in this embodiment, the aziridine crosslinking agent may include:

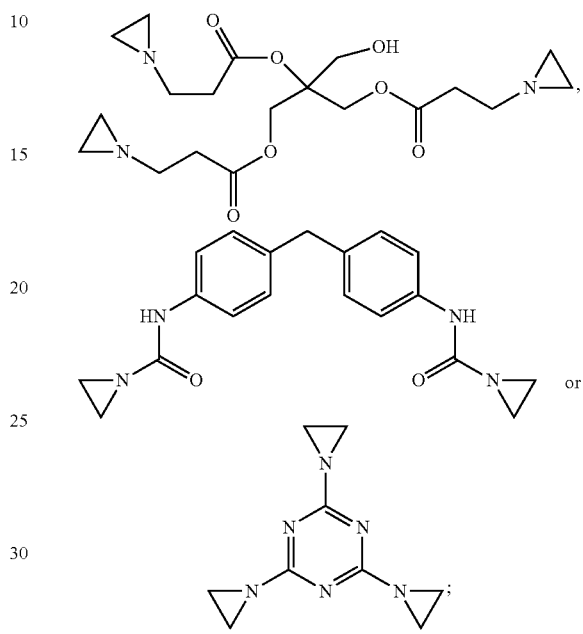

the isocyanate crosslinking agent is, for example, but not limited to: diphenyl-methane diisocyanate (MDI) or toluene diisocyanate (TDI); the diamine crosslinking agent is, for example, but not limited to: ethylenediamine, hexylenediamine or p-phenylenediamine; and the triamine crosslinking agent is, for example, but not limited to: triethylamine.

In this embodiment, the solvent is not particularly limited, as long as it can dissolve the dissolvable polyimide and the crosslinking agent. In particular, in this embodiment, the solvent includes, but is not limited to: N-methyl-2-pyrrolidone (NMP), N,N-dimethylacetamide (DMAc), dimethyl sulfoxide (DMSO), dimethylformamide (DMF) or a combination thereof.

Furthermore, in this embodiment, based on the total weight of the polyimide composition, the content of the dissolvable polyimide is 5 to 25 wt %, and preferably 8 to 20 wt %; and the content of the crosslinking agent is 1 to 15 wt %, and preferably 1 to 10 wt %. In particular, if the content of the dissolvable polyimide is lower than 5 wt %, the strength of the membrane is poor; and if the content of the dissolvable polyimide is higher than 25 wt %, the processability is poor. If the content of the crosslinking agent is lower than 1 wt %, the degree of crosslinking is insufficient; and if the content of the crosslinking agent is higher than 15 wt %, the processability is poor.

Notably, as described above, by comprising a specific ratio of the divalent organic group derived from a diamine containing aromatic group and the divalent organic group derived from a diamine containing aromatic group and carboxylic acid group, the dissolvable polyimide represented by formula 1 can be dissolved in the solvent and crosslinked with the crosslinking agent. As a result, by including the dissolvable polyimide, the crosslinking agent, and the solvent, the polyimide composition is convenient for being processed to form a membrane, and the membrane prepared with the polyimide composition has porosity and good resistance to high-polarity solvent.

Further, the polyimide composition having the above advantages is useful in the preparation of a separation membrane for use in a separation process.

[Preparation Method of Separation Membrane]

The preparation method of separation membrane according to an embodiment of the present invention includes the following steps. First, a polyimide composition according to any one of the above embodiments is provided. In particular, the polyimide composition is prepared by uniformly mixing a dissolvable polyimide with a crosslinking agent in a solvent at a temperature ranging from 15 to 100° C. The mixing method is not particularly limited, as long as the dissolvable polyimide can be uniformly mixed with the crosslinking agent in the solvent to facilitate the progression of the crosslinking process (described in detail hereinafter). Moreover, the polyimide composition and the components therein have been described in detail in the foregoing embodiments, and thus are not described here again.

Then, a crosslinking process is performed on the polyimide composition. In particular, the carboxylic acid group contained in the divalent organic group derived from a diamine containing aromatic group and carboxylic acid group in the dissolvable polyimide is cross-linked with the crosslinking agent in this step, so as to form a polyimide having a crosslinked structure. More particularly, in this embodiment, the duration of the crosslinking process is from 1 to 8 hours, and the temperature of the crosslinking process is in the range of 15 to 100° C., and preferably 50 to 80° C.

Next, the polyimide composition which has been subjected to the crosslinking process is coated on a substrate to form a polyimide membrane. In this step, the substrate is not particularly limited, as long as it can support the polyimide membrane. Particularly, the substrate is, for example, a polyester nonwoven fabric or a polypropylene nonwoven fabric. Moreover, in this step, the coating method includes, but is not limited to: doctor blade coating, wire bar coating, or screen printing. Furthermore, in this embodiment, the thickness of the polyimide membrane is from 1 to 50 μm.

Then, a dry phase inversion process is performed on the polyimide membrane, so as to obtain a separation membrane. In this embodiment, the dry phase inversion process includes a step of vaporizing the solvent in the polyimide membrane completely at a constant temperature under an inert atmosphere. That is to say, in this embodiment, the separation membrane is a dense membrane.

More particularly, in this embodiment, the temperature of the dry phase inversion process is from 50 to 80° C.

Furthermore, after the polyimide membrane is contacted with the ambient moisture, mass transfer and exchange may take place between a part of the solvent in the polyimide membrane and the moisture, such that a part of polyimide is precipitated out, and wet phase inversion takes place. Therefore, in the preparation method of separation membrane, after the polyimide composition is coated onto the substrate to form a polyimide membrane, the dry phase inversion step is performed immediately to obtain a separation membrane suitable for use in PV and VP.

Notably, as described above, the separation membrane prepared with the polyimide composition according to any one of the embodiments above after the crosslinking process, the coating process, and the dry phase inversion process has good processability, resistance to high-polarity solvent, and porosity. Further, as can be known from above, the separation membrane has a dense structure and thus the separation membrane prepared through the preparation method of separation membrane according to this embodiment can be used in PV and VP.

The features of the present invention will be described in further detail below with reference to Examples 1 to 3. Although the following examples are described, the materials used, their amounts and ratios, details and processes of treatments, etc., may be appropriately varied without departing from the scope of the present invention. Accordingly, the present invention should not be construed to be limited to the examples set forth hereinafter.

Example 1

Preparation of Dissolvable Polyimide

First, the diamine monomers BAPP and DABA were dissolved at a fixed molar ratio in an organic solvent dimethylacetamide (DMAc) or N-methylpyrrolidone (NMP). After complete dissolution, a dianhydride monomer ODPA was added for polycondensation, and a high-viscosity poly(amic acid) solution was formed, wherein the molar ratio of the monomers in reaction was BAPP:DABA:ODPA=5:5:10. Then, the poly(amic acid) was cyclized to form a dissolvable polyimide of Example 1. The dianhydride monomer was not limited to ODPA and BPDA, and the diamine monomer containing carboxylic acid group was not limited to DABA. The molar ratio of the monomers in reaction was BAPP:DABA:dianhydride monomer=5:5:10, 7:3:10 or 9:1:10.

Preparation of Polyimide Composition 15 g of the dissolvable polyimide prepared in Example 1, 5 g of an aziridine crosslinking agent, and 80 g of the solvent NMP were added to a 100 mL flask fitted with a mechanical stirrer, and stirred for 0.5 hours at 30° C. under a nitrogen atmosphere, so as to uniformly mix the dissolvable polyimide of Example 1 with the aziridine crosslinking agent in the solvent NMP. In this way, the polyimide composition of Example 1 was obtained.

Preparation of Separation Membrane

The polyimide composition of Example 1 was coated onto a polyester nonwoven fabric or a polypropylene nonwoven fabric (that is, the substrate) by doctor blade coating at 30° C. under a nitrogen atmosphere, so as to form a polyimide membrane of 5 μm in thickness. Subsequently, a dry phase inversion process was immediately performed on the polyimide membrane by drying it in an oven at 80° C., so as to obtain a separation membrane of Example 1.

Example 2

Preparation of Dissolvable Polyimide

A dissolvable polyimide of Example 2 was prepared following the same preparation process as that in Example 1.

Preparation of Polyimide Composition

A polyimide composition of Example 2 was prepared following the same preparation process as that in Example 1, except that the contents of the components in the polyimide composition of Example 2 were not absolutely the same as that in the polyimide composition of Example 1, as shown in Table 1.

Preparation of Separation Membrane

The separation membrane of Example 2 was prepared following the same preparation process as that in Example 1, except that the polyimide composition of Example 2 was used.

Example 3

Preparation of Dissolvable Polyimide

A dissolvable polyimide of Example 3 was prepared following the same preparation process as that in Example 1.

Preparation of Polyimide Composition

A polyimide composition of Example 3 was prepared following the same preparation process as that in Example 1, except that the contents of the components in the polyimide composition of Example 3 were not absolutely the same as that in the polyimide composition of Example 1, as shown in Table 1.

Preparation of Separation Membrane

The separation membrane of Example 3 was prepared following the same preparation process as that in Example 1, except that the polyimide composition of Example 3 was used.

TABLE 1

|  | Example 1 | Example 2 | Example 3 |
|---|---|---|---|
| Dissolvable polyimide (wt %) | 15 | 15 | 15 |
| Aziridine crosslinking agent (wt %) | 5 | 10 | 12.5 |
| NMP (wt %) | 80 | 75 | 72.5 |

Then, the solvent resistance test, and the measurements of the permeation flux and the water concentration in permeate were performed on the separation membranes of Examples 1-3. The above-mentioned measurements are illustrated below. The results of the permeation flux and the water concentration in permeate are shown in Tables 2 to 4.

<Solvent Resistance Test>

The separation membranes of Examples 1-3 were placed in the solvent NMP for 24 hours, and observed. The results show that the cross-linked separation membranes of Examples 1-3 are not back dissolved in the solvent NMP. That is, the separation membranes of Examples 1-3 have good stability against NMP.

<Measurement of Permeation Flux and Water Concentration in Permeate>

The separation membranes of Examples 1-3 were placed in a flat membrane pervaporation apparatus respectively to carry out pervaporation. In particular, during the pervaporation, the operation temperature was 25° C., the feed solution was contacted in liquid form with the outer surface of the separation membrane, the pressure at the downstream side was maintained at 3 to 5 mmHg by means of a vacuum pump, thereby forming a pressure difference that allows the feed solution to permeate the separation membrane as a gas, and leave from the internal surface. The gaseous material leaving the internal surface was condensed with liquid nitrogen and collected at the downstream side.

The permeation flux is calculated by an equation below:

$$P = \frac{W}{A \times t} (g/m^2 h)$$

wherein P, W, A and t are respectively the permeation flux (g/m² h), permeation weight (g), active area on the outer surface of the separation membrane (m²), and operation time (h).

The water concentration in permeate is obtained by detecting the condensed and collected material at the downstream side by gas chromatography (GC).

Particularly, in an experiment, the feed solution is a 50 wt % NMP solution in water. The permeation flux and the water concentration in permeate of the separation membrane in Example 3 are shown in Table 2. In another experiment, the feed solution is a 90 wt % NMP solution in water, and the permeation flux and the water concentration in permeate of the separation membranes in Examples 1-3 are shown in Table 3. In a further experiment, the feed solutions are a 70 wt % isopropanol (IPA) solution, a 90 wt % IPA solution, a 70 wt % ethanol (EtOH) solution and a 90 wt % EtOH solution, and the permeation flux and the water concentration in permeate of the separation membrane in Example 3 are shown in Table 4.

TABLE 2

| 50 wt % NMP | Example 1 | Example 2 | Example 3 |
|---|---|---|---|
| Permeation flux (g/m²h) | — | — | 339.11 |
| Water concentration in permeate (wt %) | — | — | 100 |

TABLE 3

| 90 wt % NMP | Example 1 | Example 2 | Example 3 |
|---|---|---|---|
| Permeation flux (g/m²h) | 90.55 | 158.62 | 160.32 |
| Water concentration in permeate (wt %) | 98.1 | 99.1 | 100 |

TABLE 4

| Example 3 | 70 wt % IPA | 90 wt % IPA | 70 wt % EtOH | 90 wt % EtOH |
|---|---|---|---|---|
| Permeation flux (g/m²h) | 2060.50 | 1185.21 | 2024.44 | 1033.93 |
| Water concentration in permeate (wt %) | 99.4 | 99.9 | 99.8 | 99.8 |

It can be known from Tables 2 to 4 that the separation membranes of Examples 1-3 all have good resistance to high-polarity solvents, permeation flux, and water concentration in permeate. Therefore, the separation membranes of Examples 1-3 are suitable for use in PV and VP.

The present invention has been described by way of examples; however, the present invention is not limited thereto. Various changes and modifications may be made by those skilled in the art without departing from the spirit and protection scope of the present invention as defined by the appended claims.

What is claimed is:

1. A polyimide composition, used in a preparation method of a separation membrane, comprising:
a dissolvable polyimide, represented by formula 1:

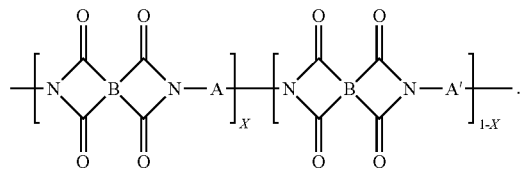

formula 1 wherein B is a tetravalent organic group derived from a tetracarboxylic dianhydride containing aromatic group, A is a divalent organic group derived from a diamine containing aromatic group, A' is a divalent organic group derived from a diamine containing aromatic group and carboxylic acid group, and 0.1≤X≤0.9;

a crosslinking agent, wherein the crosslinking agent is an aziridine crosslinking agent, an isocyanate crosslinking agent, an epoxy crosslinking agent, a diamine crosslinking agent, or a triamine crosslinking agent; and a solvent, wherein the preparation method of the separation membrane comprises performing a crosslinking process on the polyimide composition, and a temperature of the crosslinking process is from 15 to 30° C.

2. The polyimide composition according to claim 1, wherein B is

[chemical structures]

, A is

[chemical structures]

3. The polyimide composition according to claim 1, wherein B is

[chemical structure]

, A is

[chemical structure]

and A' is
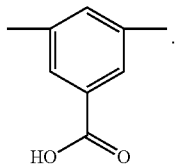
4. The polyimide composition according to claim 1, wherein the aziridine crosslinking agent comprises:
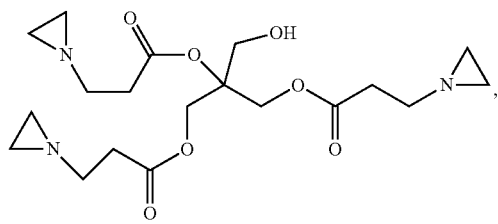
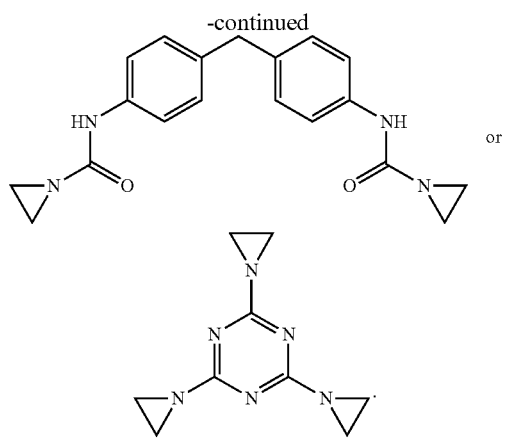
5. The polyimide composition according to claim 1, wherein based on a total weight of the polyimide composition, a content of the dissolvable polyimide is 5 to 25 wt %, and a content of the crosslinking agent is 1 to 15 wt %.
* * * * *